United States Patent [19]

Svensson

[11] 4,272,812
[45] Jun. 9, 1981

[54] NUMERICAL CONTROL APPARATUS FOR STEPPED FEEDING AT PUNCH AND NIBBLING MACHINES

[76] Inventor: Sven L. I. Svensson, Tegelvägen 61, 723 48 Västerås, Sweden

[21] Appl. No.: 33,228

[22] Filed: Apr. 25, 1979

[30] Foreign Application Priority Data

Apr. 26, 1978 [SE] Sweden ............................. 7804806

[51] Int. Cl.³ ...................... G06F 15/46; B26D 5/20; B23D 27/00
[52] U.S. Cl. ...................................... 364/475; 83/71; 83/203; 83/277; 83/916; 318/39; 318/603
[58] Field of Search ............... 364/475, 118, 114, 474; 318/571, 640, 685, 696, 39, 569, 603, 600; 83/71, 72, 262, 203, 277, 916, 205; 271/256, 257, 258

[56] References Cited

U.S. PATENT DOCUMENTS

| | | | |
|---|---|---|---|
| 3,427,518 | 2/1969 | Cloup | 364/475 X |
| 3,614,575 | 10/1971 | Cutler | 318/571 X |
| 3,873,899 | 3/1975 | Seo et al. | 318/39 X |
| 3,919,907 | 11/1975 | Kindgren | 83/368 |
| 4,024,446 | 5/1977 | Burnett | 318/685 |
| 4,062,213 | 12/1977 | Schneider et al. | 364/475 X |
| 4,126,068 | 11/1978 | Bromer | 83/916 X |

Primary Examiner—Joseph F. Ruggiero
Attorney, Agent, or Firm—Robert E. Burns; Emmanuel J. Lobato; Bruce L. Adams

[57] ABSTRACT

In a nibbling machine having a fixed tool, a punching tool reciprocated by crank mechanism including a crankshaft and means for feeding a workpiece step-by-step between the fixed tool and the punching tool, feeding movement of the workpiece is controlled by a computer so that the workpiece is stopped while engaged by the punching tool but a maximum period of time is provided during which the workpiece can be moved. A pulse generator connected with the crankshaft generates 1000 to 20,000 pulses per revolution. These pulses and also information as to the thickness of the workpiece are fed to the computer, which is programmed to block workpiece feed movement when the number of pulses after top dead center corresponds to a first angular position of the punching tool just clear of the workpiece and to resume workpiece feed movement when the number of additional pulses counted corresponds to a second angular position of the crankshaft in which the punching tool again just clears the workpiece after having engaged it.

7 Claims, 3 Drawing Figures

NUMERICAL CONTROL APPARATUS FOR STEPPED FEEDING AT PUNCH AND NIBBLING MACHINES

FIELD OF THE INVENTION

The present invention relates to a numerical control apparatus for stepped feeding of a workpiece worked on between a fixed tool and a punch tool operating reciprocally against said fixed tool by a crank movement, the feed travel being determined by a computer.

BACKGROUND OF THE INVENTION

Machines used for machining plate and sheets have a fixed bottom tool or die and a top tool or punch moving reciprocally to and from the fixed tool. The movable tool can be driven with the aid of a simple crank movement. Such machines are punches and/or nibbling machines, for example. The invention is directed to this kind of plate or sheet working machines.

Between each working stroke of the punch the workpiece ("sheet") is moved a definite distance in a certain feed direction. Feeding the workpiece in this way can be done manually or with the help of purely mechanical means which are coordinated with the tool movement in some way. In certain cases, such as in single stroke punching, the top tool movement is arrested after each working stroke by disengaging the eccentric shaft and simultaneously braking it at the top end position of the crank movement.

In numerically controlled machines, feeding the workpiece is done with the help of servo devices which move the workpiece in one direction, or in two directions usually at right angles to each other. These servo devices can consist, for example, of d.c. or hydraulic motors which give the workpiece a definite feed travel during each feed step via a screw spindle. Electronic control equipment in the form of a computer is used to control the servo devices according to a desired program. Digital-analog control signals are sent by the computer to the servo devices according to a definite program.

During the part of the working stroke, where the punch is in contact with the workpiece or passing through it, the workpiece must be kept stationary and feed must therefore be blocked. Blocking must begin when there is a definite minimum distance between punch and die, and this distance should be somewhat greater than the thickness of the workpiece. The blocking function must be retained until the punch, after going through its bottom turning position, has once again departed a corresponding distance from the die. There is naturally no obstacle in already beginning or terminating the feed movement blocking operation at greater distances between the punch and die than what is unavoidably necessary, but to best utilize the available portion of the punching cycle time for feeding, and thereby to optimize the production capacity of the machine, it is desirable that blocking is started immediately before the tool reaches the workpiece and is terminated immediately after the tool leaves the workpiece. There is then the maximum time available for each feed step.

In a simple symmetrical crank movement, each angular position of the crankshaft corresponds to a definite distance between the outer turning position of the reciprocating piston and its actual position, i.e. the distance between punch and die in the case in question. The rotation of the crankshaft can thus be utilized to indicate the distance of the punch from the die. This condition can be utilized in numerically controlled machines for determining the instant when blocking the workpiece shall be started and terminated, in response to the thickness of the workpiece. To start with, a certain thickness of the workpiece is considered, and the distance between punch and die which is to be maintained for allowing the feed of the workpiece is determined. This distance is used to determine the corresponding angular position of the crankshaft for the initiation and termination of blocking. An indicator in the form of a cam plate which coacts with a contact device is attached to the crankshaft. The contact device gives a signal to the computer controlling feed that it is to perform the blocking operation during the period of the work cycle when the cam plate passes the contact device. The peripheral length of the cam plate coacting with the contact device can be adjusted to the plate thickness in question by suitable means.

In a further case in the prior art, electrical contact between the punch and the upper surface of the workpiece is utilized to determine the time at which the feed movement of the workpiece shall be blocked, or initiated once again.

These known devices lead to relatively complicated structures, however, especially when they include means which are fitted in the immediate vicinity of the area worked, and are thus a hindrance, e.g. in cases where the machine has apparatus for automatic tool changing or other auxiliary apparatus which must be given a place in the immediate vicinity of the work area.

SUMMARY OF THE INVENTION

The present invention has the object of providing a numerically controlled apparatus of the kind set forth above where information on the angular position of the eccentric shaft is directly transferred to the numerical control equipment or computer and the latter is programmed to give the necessary control commands in determined angular positions to the servo devices for the workpiece feed movement, and possible further control orders to the operating controls on the machine. The computer can also be programmed to block the feed movements in response to the thickness of the workpiece, i.e. so that blocking is started and terminated in definite angular positions corresponding to the necessary distance between punch and die for varying thicknesses of workpiece.

The numerical control apparatus in accordance with the invention is characterized by a pulse transmitter, coupled to the crankshaft of the crank movement to transmit a plurality of pulses from a definite reference position of the shaft to the computer corresponding to the rotational angle of the shaft from the reference position, the computer being programmed to block the feed movement of the workpiece in a first angular position of the shaft, and in a subsequent second angular position once again to release this feed movement. The apparatus suitably operates symmetrically, so that the first and the second angular positions correspond to equal distances between punch and die. These distances are preferably selected so that the workpiece can be fed forward between the tools with a certain required clearance.

The computer is programmed for every case which can arise, by introducing data on the thickness of the workpiece into the computer.

The pulse transmitter is suitably connected to the shaft of the crank movement. It can be a digital pulse transmitter with photo-electric cells or inductive pulse-generating means, or can be an analogue angular transmitter with an A/D converter. The necessary measuring value resolution can be obtained with known such types of pulse transmitter without any difficulty occurring.

Movement of the workpiece is done in a manner known per se with the help of servo devices comprising pulse motors controlled from the computer according to its set program.

In a preferred embodiment for eccentric presses, the necessary operation of press engagement and braking in the upper end position of the crank movement can be controlled from the computer.

With nibbling, a definite feed step is usually programmed. The apparatus in accordance with the invention operates in such cases as a further safety measure, in that the positions determined for start and stop of the feed movement in accordance with the programmed plate thickness are maintained by over-riding impulses from the computer, which means that the required blocking of the feed always takes place, even if the machine were not to keep up with the originally programmed feed cycle.

BRIEF DESCRIPTION OF THE DRAWINGS

The invention is described below in the form of embodiment examples and while referring to the accompanying drawings.

DESCRIPTION OF PREFERRED EMBODIMENT

Figure 1:
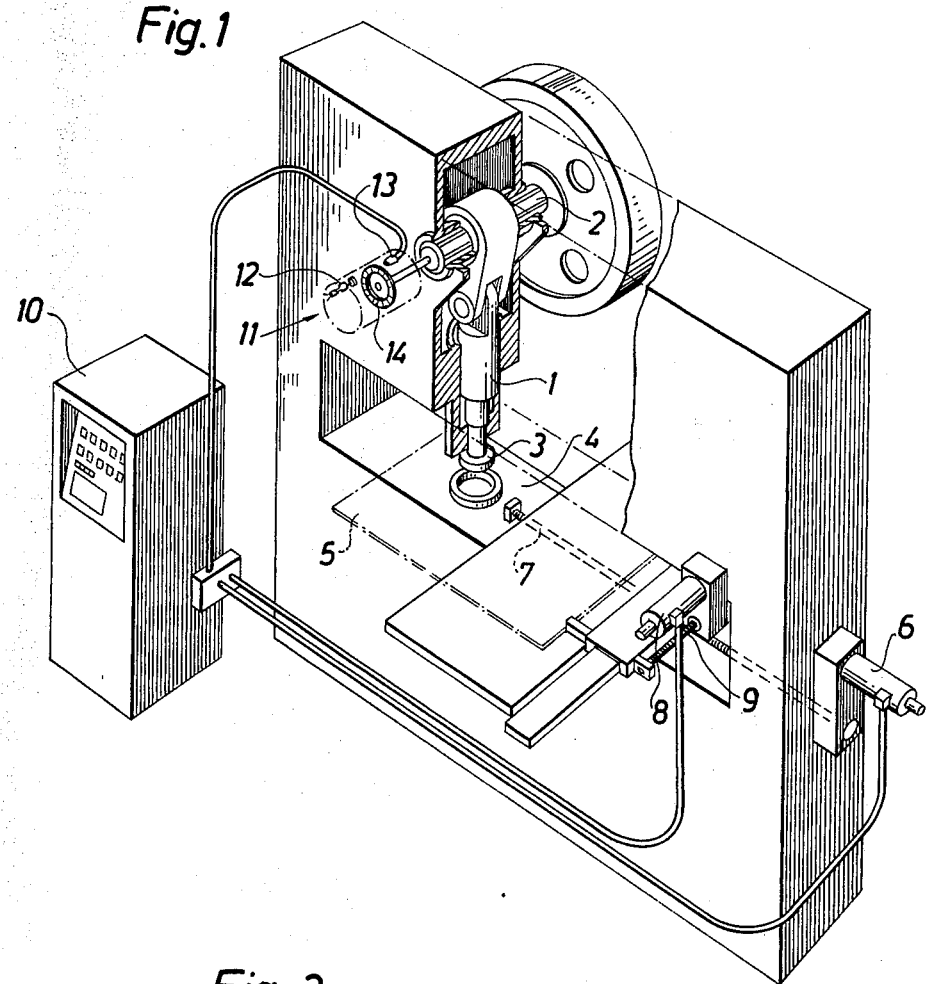
FIG. 1 shows a portal press in perspective, partially in section, with a crank-driven upper tool and numerical control equipment in accordance with the invention.

FIG. 1 shows schematically a punching press with a closed frame. A portion of the frame is cut away to show the crank movement driving the punch tool. A cutter slide 1 is conventionally coupled by a connecting rod to a crankshaft or eccentric shaft 2. The cutter slide carries at its bottom end a punch 3 for coaction with a fixed die 4. The workpiece (plate) 5 is fed horizontally in between the punch and die in two corresponding right-angular directions with the help of the respective servo devices 6 and 8 in the form of pulse-driven motors, which by means of screw spindles 7 and 9 transfer their movement to the holder, displaceable in two directions at right angles, for the plate 5.

A pulse transmitter 11 is connected to the eccentric shaft 2. This transmitter comprises a disc 14 rotatable by the eccentric shaft, and provided with alternatingly transparent and non-transparent zones, there being a light source 12 for directing a light beam onto said zones. In the direction of the light beam on the other side of the disc there is arranged a photo diode 13. When the disc rotates, the light beam impinging on the photo diode or photo cell will be interrupted at the same rate as the non-transparent zone of the disc passes the light beam, and the photo cell will receive light pulses at the same rate. The photo diode converts the variation in light strength to electrical pulses which are transmitted to a counter in the control apparatus computer 10. A pulse transmitter of this type can transmit up to 20,000 pulses per revolution. This high measuring value resolution is not always necessary in control apparatus in accordance with the invention. The pulse transmitter in the case described thus suitably has a measuring value resolution of 2,000 to 1,000 pulses per revolution. At 1,000 pulses per revolution, every electrical impulse to the computer counter will correspond to an angular alteration of 21.6 minutes.

The digital photo-electric pulse transmitter in accordance with the above can alternatively be replaced by a digital inductive pulse transmitter. In this case the disc 14 is radially slit and the zones remaining between the slits are arranged to pass by an induction coil, which transmits an electric pulse to the computer 10 for each passage. The disc in this case must of course be made from suitable magnetic material.

As a further alternative to said digital pulse transmitter, an analogue angular indicator can be used in combination with an analog-digital converter, and the analogue angular indicator is then connected to the eccentric shaft 4 and replaces the disc 14.

The pulses obtained from the pulse transmitter 11 are counted in the computer from a selected reference point, suitably top dead center of the crank movement. The counted pulses unambiguously identify the angular position of the eccentric shaft. The computer can now be programmed to determine the angular positions when certain control commands are to be sent. In an eccentric press for example, a control order can be sent for operating the clutch and brake in the desired positions.

In programmed feeding of the workpiece in a punching machine, the feed is done in different directions with the help of servo devices such as the above mentioned pulse driven motors 6 and 8. These motors are given their control orders from the control apparatus computer. According to the invention, the feed step shall be determined so that the feed movement of the workpiece is blocked at least as long as the punch has its end surface under the upper surface of the workpiece, i.e. as long as the punch is passing through the workpiece. At the same time, the greatest possible time shall be available for travel in each step. This means that blocking the workpiece shall be started immediately before the end surface of the punch reaches the upper surface of the workpiece, and blocking shall be terminated immediately after the punch has left the workpiece. These positions correspond to definite crank angles. The task of the control apparatus is to determine, for each thickness of the workpiece (plate or sheet thickness), and with the help of the pulse transmitter and computer, the relative angular positions of the crankshaft where control impulses are to be sent from the computer to the servo devices for the necessary blocking of the respective feed.

Figure 2:
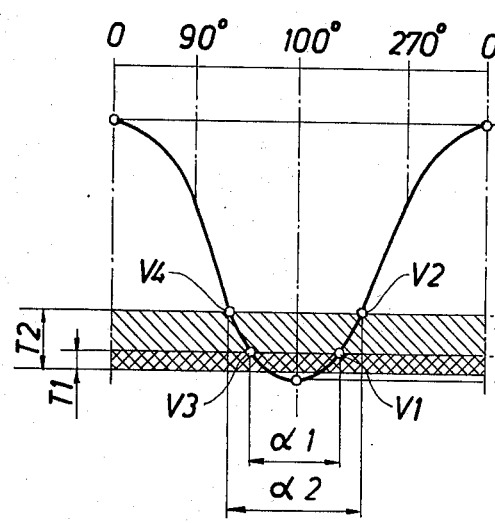
FIG. 2 shows the cutter slide motion diagram.
Figure 3:
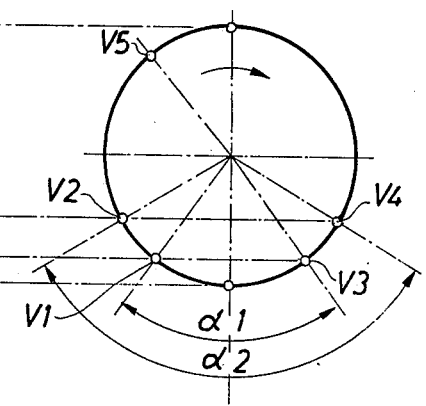
FIG. 3 shows the corresponding circular diagram for the eccentric shaft of the crank movement.

FIG. 2 shows the motion diagram for the cutter slide 1 and punch 3, the diagram having the appearance of a somewhat deformed sinusoidal curve, due to the crank mechanism. FIG. 3 shows the corresponding circular diagram for the crank movement shaft. In these figures the following designations are used:

T1: thickness of a thin sheet
T2: thickness of a plate
$\alpha 1$: the part of the crankshaft revolution where the feed movement shall be blocked for a sheet thickness T1
$\alpha 2$: the part of the excentric shaft revolution where the feed movement shall be blocked for a plate thickness T2

V1, V2: the crank angles at which the feed movement is permitted to start for thicknesses T1 and T2

V3, V4: the crank angles at which the feed movement is blocked for thicknesses T1 and T2

V5: the crank angle at which the press clutch releases the eccentric shaft from the flywheel and the brake comes into operation The pulse transmitter is zeroed with the cutter slide in the top position, i.e. top dead center, all angular positions being reckoned from this point.

The control apparatus computer is now programmed to send control impulses to the servo devices for the selected angular positions. As is apparent from FIG. 3, these angular positions alter in response to the thickness of the workpiece. According to the invention, information is introduced as to the actual plate thickness used, consideration being simultaneously given to the necessary clearance for feeding the sheet between punch and die. With guidance from this information, the crank angles at which feed movements shall start and stop are automatically calculated in the computer. This movement is thus permitted during the part of the eccentric shaft revolution corresponding to the angle $360-\alpha°$.

For an eccentric press, the angular position V5 can also be programmed, the computer giving a control impulse to the servo devices at this angular position for operating the press clutch or brake.

In nibbling with continuous steps, the feed travel per stroke must also be included in the detail program for controlling the workpiece. If the command feed travel exceeds what the machine manages to accomplish during the time it takes for the crankshaft to rotate the angle $360-\alpha°$, the computer is programmed such that the start of the servo devices 6 and 8 is prevented. Stop signals from the pulse transmitter at the crank angle where the punch comes into contact with the workpiece, i.e. the angular positions V3 or V4, are thus only an extra safety measure for ensuring that no movement of the workpiece takes place during the shearing operation.

With a pulse transmitter for 1,000 pulses per revolution, the distance between punch and die can be given with a tolerance of 0.03 mm. The time available for feed can thus be completely utilized without manual resetting and without mechanical aids, while also taking into account the necessary clearance for moving the workpiece between punch and die.

What I claim is:

1. A numerically controlled nibbling machine comprising a fixed tool, a punching tool cooperating with said fixed tool, means including crank mechanism having a crankshaft for cyclically reciprocating said punching tool relative to said fixed tool between a working position and a release position, step feeding means for moving a workpiece step-by-step between said fixed tool and said punching tool while said punching tool is in release position, computer means controlling said feeding means, means for generating a multiplicity of pulses each revolution of said crankshaft, said pulse generating means comprising a rotor rotatable with said crankshaft and having a multiplicity of angular zones each representing a small angle of rotation of said crankshaft and a sensor for detecting passage of said zones as said rotor rotates to generate said pulses, means for feeding said pulses and information of the thickness of said workpiece to said computer means, said computer means being programmed to send a control signal to said step feeding means for blocking the workpiece feed movement when the number of pulses transmitted to said computer following top dead center, as a reference, corresponds to a first angular position of said crankshaft in which said punching tool just clears a workpiece of predetermined thickness, and subsequently to send a control signal to said feeding means for resumption of workpiece feed movement when the number of additional pulses transmitted to said computer corresponds to a second angular position of said crankshaft in which said punching tool again just clears said workpiece of predetermined thickness after having engaged said workpiece.

2. A numerically controlled nibbling machine according to claim 1, in which said pulse generating means comprises a photoelectric pulse generator comprising a disc operatively connected to said crankshaft, said disc having alternate transparent and nontransparent zones, a light source disposed to direct light against said disc, and a photodiode on the opposite side of said disc in position to receive light transmitted through said transparent zones.

3. A numerically controlled nibbling machine according to claim 1, in which said pulse generating means comprises an inductive pulse generator comprising a metal disc operatively connected to said crankshaft and having slits defining inductive fields, and an induction coil associate with said disc in position to be in said fields.

4. A numerically controlled nibbling machine according to claim 1, in which said pulse generating means comprises an analog angular indicator operatively connected to said crankshaft and an analog-digital converter connected to said indicator for transmitting pulses.

5. A numerically controlled nibbling machine according to any one of claims 2 to 4 in which said pulse generating means has a measuring resolution of at least 1000 pulses per revolution.

6. A numerically controlled nibbling machine according to claim 1, in which said feeding means comprises servo devices for step feeding said workpiece in two directions at right angles to one another.

7. A numerically controlled nibbling machine according to claim 1, in which said computer is programmed to control said feeding means to feed said workpiece a predetermined distance per stroke of said punching tool and is further programmed so that operation of said feeding means is prevented if the time required for said programmed movement exceeds the time required for said crankshaft to turn from said angular position to said first angular position.

* * * * *